Sept. 8, 1942.  C. T. COLE, JR  2,295,384
CONTINUOUSLY VARIABLE INDUCTANCE DEVICE
Filed April 30, 1941
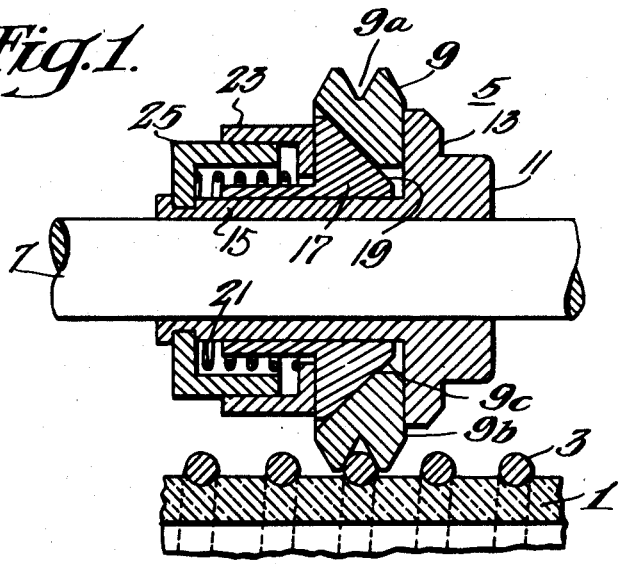
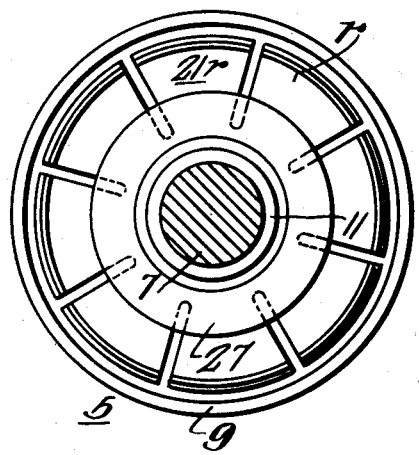
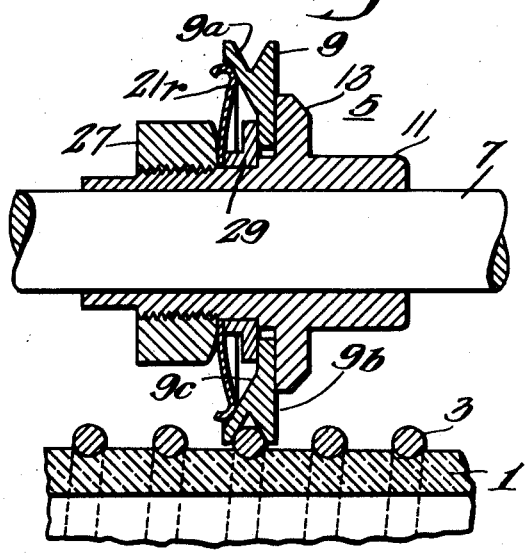
Inventor
Charles T. Cole, Jr.
By
Attorney Patented Sept. 8, 1942

2,295,384

UNITED STATES PATENT OFFICE 2,295,384

CONTINUOUSLY VARIABLE INDUCTANCE DEVICE

Charles T. Cole, Jr., Drexel Hill, Pa., assignor to Radio Corporation of America, a corporation of Delaware Application April 30, 1941, Serial No. 391,164

2 Claims. (Cl. 171—242)

This invention relates to continuously variable inductance devices of the type suitable for use in the frequency-determining or "tank" circuit of a radio transmitter and has for its principal object to provide an improved rotatable electrical contact for such a device.

Because they are less subject to friction and resulting wear, trolley-wheel contacts have largely superseded wiper arms as the medium for adjusting the effective inductance of a space-wound inductance device of the general character described. Trolley wheel contacts however are peculiarly susceptible to jamming since, as a practical matter, it is impossible to so wind and so mount a space-wound coil that there is no eccentric movement between it and the trolley wheel. In an effort to obviate this objection to contacts of the trolley wheel type, it has previously been proposed (see U. S. Patent 2,178,221 to F. C. Blancha) to mount the trolley wheel for rotation on an axle supported on a U-shaped arm which is adapted to slide on a rod mounted parallel to the axis of rotation of the coil and to urge the wheel into contact with a turn of the coil as by means of a biasing spring which moves with the said arm.

In such an arrangement the spring compensates effectively for any eccentricity in the mounting of the coil-form but it will be apparent (the more readily so if the arm upon which the wheel is mounted is considered as a lever) that if the wheel encounters a coil turn of abnormal pitch the resulting strain or twisting force upon the wheel will be transferred with augmented intensity to the U-shape arm upon which the trolley axle is mounted. Incidents have arisen where the twisting force applied to the support rod through the opposite legs of the U was of an intensity sufficient to prevent the wheel from following the coil and to cause the wheel to be moved, against the force of its bias, out of contact with the coil.

Accordingly, another and important object of the present invention is to obviate the foregoing and other less apparent objections to trolley-wheel contacts of the prior art.

Certain details of construction together with other objects and advantages will be apparent and the invention itself will be best understood by reference to the following specification and to the accompanying drawing, wherein:

Figure 1 is a fragmentary sectional view showing so much of a continuously variable inductance device as is necessary to a clear understanding of the invention, Figure 2 is a similar sectional view showing an alternative embodiment of the invention, and Figure 3 is an end elevational view of the device of Fig. 2.

In the drawing wherein like reference characters designate the same or corresponding parts in all figures, 1 designates a portion of a revolubly mounted insulating form having a conventional space-wound coil 3 thereon and 5 designates generally a trolley which is mounted to permit of both longitudinal and rotatable movement on a fixed shaft 7 arranged parallel to the axis of rotation of the coil form.

In accordance with the invention the trolley comprises a grooved rim 9 which is resiliently mounted on the hub 11 so that the said rim may ride on and along the turns of the coil in spite of minor eccentricities encountered in the rotation of the coil about its axis.

In the embodiment of the invention shown in Fig. 1 the hub 11 which is slidably mounted on the shaft 7 comprises a head 13 which extends in a direction normal to the parallel axes of the rod 7 and coil 3, and a bearing surface 15, of reduced diameter, upon which a sleeve 17 is slidably mounted. This sleeve 17 is provided with a conically tapered head 19 which extends outwardly therefrom at an angle with respect to the head 13 on the hub 11. The rim 9, in the groove 9a of which a coil-turn is received, is mounted in the space between the hub-head 13 and the sleeve head 19 and to this end is provided, on the one side with a plane vertical surface 9b and on its opposite side with a conically tapered surface 9c which rides on the complementarily tapered surface 19 on the head of the sleeve 17.

A coiled spring 21 arranged about the sleeve 17 and which is anchored adjacent the bearing-end of the hub 11 exerts its force against the head of the sleeve and causes the tapered surface 19 thereon to bear against the tapered surface 9c of the rim 9. This obviously serves to center the grooved rim 9 with respect to the axis of movement of the hub 11 and, in the event that the rim encounters any eccentricity in the rotation of the coil about its axis, permits the rim to be rotated off its normal center as long as the eccentricity is encountered. Where, as in the instant embodiment of the invention, the spring 21 is constituted of steel, it is desirable to shield the spring from radio frequency voltages and to this end a "dust cap" comprising two oppositely located inwardly directed and interfitting cupshape elements 23 and 25, respectively, surround the spring.

In the simplified embodiment of the invention shown in Figs. 2 and 3 the biasing force tending to center the grooved rim 9 is provided by a "rosette" spring 21r which is securely clamped directly to the hub 11 as by means of a nut 27 and washer 29 disposed on opposite sides of the spring. The rim 9 in this case is somewhat loosely mounted between the opposed surfaces of the washer 29 and the head 13 of the hub, and the biasing force is supplied radially to the tapered under surface 9c of the rim 9 through the separate petals or leaves "r" of the spring 21.

Various other modifications of the invention will suggest themselves to those skilled in the art. It is to be understood therefore that the foregoing is to be interpreted as illustrative and not in a limiting sense except as required by the prior art and by the spirit of the appended claims.

What is claimed is:

1. In a continuously variable inductance device comprising a space-wound coil having an axis of rotation and a fixed rod mounted parallel to said axis, a trolley comprising a hub slidably mounted on said rod and having a head extending in a direction normal to the axes of said rod and coil, a sleeve slidably mounted on said hub and having a tapered surface extending at an angle with respect to said head, a rim surrounding said hub with its outer surface presented to a turn of said coil and having a complementarily tapered surface presented to the tapered surface of said sleeve, and resilient means on said hub for biasing the tapered surface of said sleeve into contact with the tapered surface of said rim whereby to resiliently center said rim with respect to the axis of movement of said hub.

2. In a continuously variable inductance device comprising a space-wound coil having an axis of rotation and a fixed rod mounted parallel to said axis, a trolley comprising a hub slidably mounted on said rod and having a head extending in a direction normal to the axes of said rod and coil, a rim surrounding said hub in contact with said head and with its outer surface presented to a turn of said coil and having a tapered inner surface extending at an angle with respect to the direction of extension of said head, a sleeve slidably mounted on said hub and having a complementarily tapered surface presented to said tapered inner surface of said rim, and resilient means for urging said sleeve into contact with the tapered surface of said rim, said tapered surfaces being so arranged with respect to said rod as to tend to center said rim on said hub under the influence of said resilient means.

CHARLES T. COLE, Jr.